UNITED STATES PATENT OFFICE 2,087,020

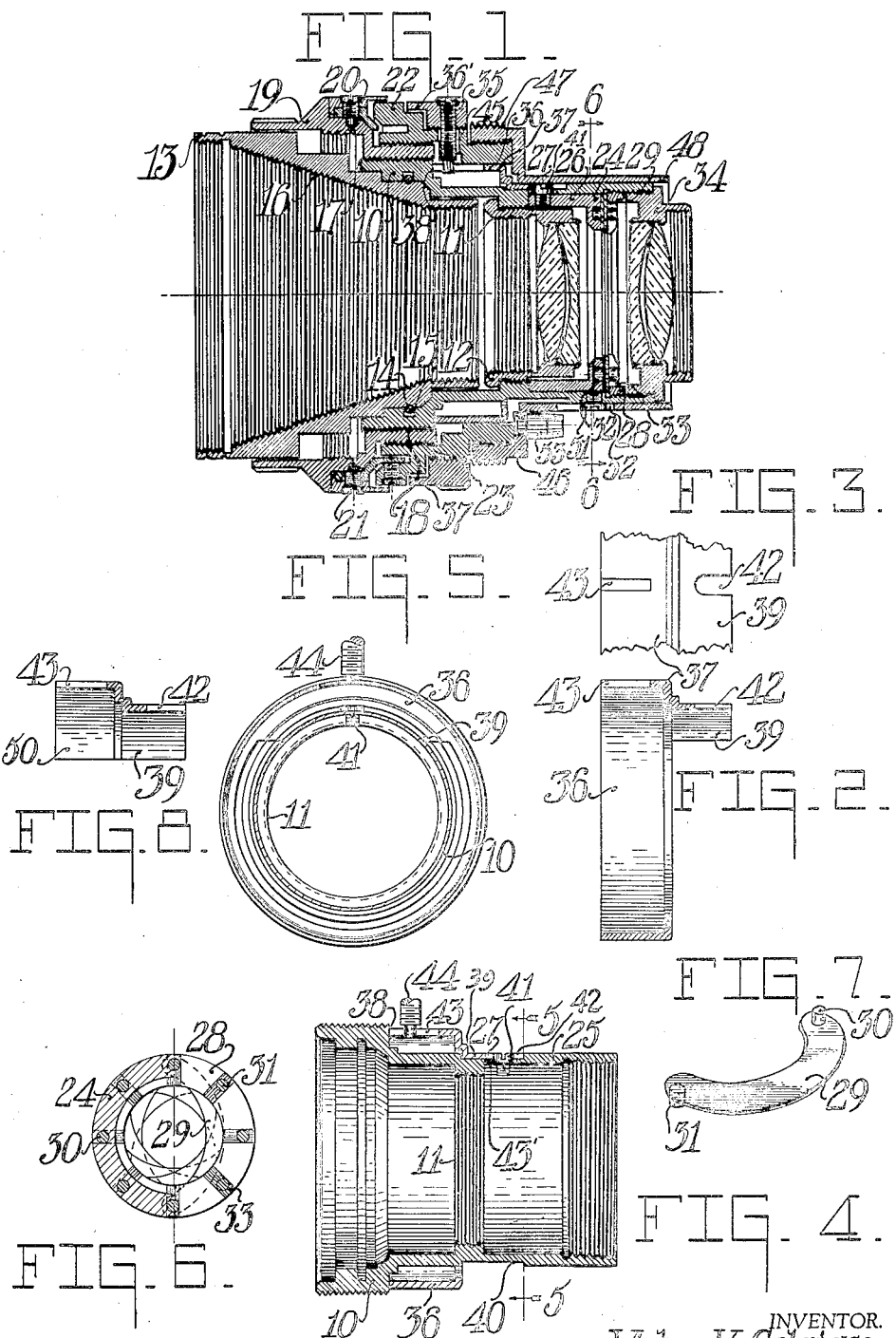
July 13, 1937.  V. V. COLAIACE  2,087,020
FOCUSING LENS MOUNT
Filed Feb. 26, 1936
INVENTOR.
Victor V. Colaiace,
BY
ATTORNEYS

FOCUSING LENS MOUNT

Victor V. Colaiace, Rochester, N. Y., assignor, by mesne assignments, to Eastman Kodak Company, Jersey City, N. J., a corporation of New Jersey Application February 26, 1936, Serial No. 65,870

5 Claims. (Cl. 95—64)

This invention relates to photography and particularly to optical units for cameras. One object of my invention is to provide a focusing lens mount in which the diaphragm operating ring is remotely connected with the mounting for the diaphragm leaves. Another object is to provide a simple and positive connection between the diaphragm operating ring and the diaphragm of the lens mount. Another object is to provide a novel connecting means between the diaphragm operating ring of a lens mount and the diaphragm proper which lends itself to easy assembly on said mount. And a still further object is to provide a connecting means between the diaphragm operating ring on a lens mount and the diaphragm proper which is adapted to be seated in a groove in the lens tube for its operating position, but still be assembled in said groove by being slid over the rear end of said lens barrel without being sprung out of place.

In a focusing lens mount in which the diaphragm operating ring is remotely displaced from the movable diaphragm ring I provide a novel offset connecting member, which may take the form of a ring, said connecting member being adapted to act as a positive motion transference means between the two parts. One end of the connecting member is provided with a longitudinal slot into which a screw through the diaphragm operating ring extends. The other end of said connecting member is milled off to leave a one-quarter arcuate lip which is adapted to slip into a seating groove around the periphery of the lens tube so that a slot in the one-quarter lip will engage a set screw which is fixed to the movable diaphragm ring and adapted to extend through a slot in the lens tube and into the circumferential groove therein.

This connecting member is fitted to the lens barrel so that it is prevented from longitudinal movement there-along, and it is held against radial displacement from said mount by means of a collar and an adapter ring. The connecting member or ring is suitably milled so that it can be slipped over the rear end of the lens barrel for assembling purposes and dropped into the circumferential groove in said lens tube.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawing in which, Figure 1 is a section through the focusing objective and mount constructed in accordance with and illustrating a preferred embodiment of my invention;

Figure 2 is a section through a preferred form of my novel connecting ring;

Figure 3 is a partial plan of the connecting ring shown in Figure 2;

Figure 4 is a section through the lens tube of a focusing lens mount with my connecting ring mounted thereon;

Figure 5 is a section taken on line 5—5 of Figure 4;

Figure 6 is a fragmentary section taken on line 6—6 of Figure 1; parts being broken away to better show the diaphragm ring structure;

Figure 7 is a perspective of a diaphragm leaf, and

Figure 8 is a section through a modified form of my connecting ring.

Like reference characters refer to corresponding parts in the several figures.

As shown in Figures 1 and 4 the main part of the lens mount consists of the lens tube 10 which is internally threaded at 11 to receive the front lens element 12. The front end of the lens tube 10 is adapted to receive a baffle tube 13 which is frictionally engaged in said tube by a split ring 14 seated in a groove 15. This baffle tube 13 serves merely to give the forward end of the mount a more finished appearance, and to act as a light shield to protect the lenses from extraneous light. For the purpose of cutting down undesirable reflection, the interior of the baffle 13 is provided with a plurality of grooves or corrugations 16.

The forward enlarged end of the lens tube 10 is externally threaded at 17 to receive an internally threaded portion 18 of the focusing ring 19. The focusing scale 20 is fixed to a reduced portion of the focusing ring by means of set screws 21, this means of fixing the scale to the focusing ring allowing the zero point of the focusing scale to be properly set with reference to a given mark on the stationary collar 22 which is threaded to the focusing ring at 23. It is to be understood that the threaded engagement between the collar 22 and the focusing ring 19, as shown at 23, and the threaded engagement between the focusing ring and the lens tube 10 are differential so that by revolving the focusing ring 19 the lens tube 10 and the lens element associated therewith can be moved axially with respect to the stationary collar 22 for the purpose of altering the focus of the lenses therein.

A movable diaphragm ring 24 is rotatably mounted in a smooth bored portion 25 on the interior of the lens tube 10, and is longitudinally positioned therein by having a forwardly extending portion 26 in abutment with the flange 27 of the threaded portion 11. A stationary diaphragm ring 28 is screwed into the rear end of the lens tube 10 so that the space between it and the movable diaphragm ring 24 just allows the intervening of the diaphragm leaves 29.

The assembly and operation of the diaphragm leaves are accomplished in the usual manner. As shown in Figure 7, each individual diaphragm leaf is provided with two pins 30 and 31 which are fixed to the ends thereof to extend on opposite sides of the leaf. One of the pins, for instance 30, is adapted to engage slot 32 in the movable ring, while the other pin 31 engages in elongated slot 33 in the stationary diaphragm ring 28. Therefore, when a plurality of leaves are mounted in this manner, and the movable diaphragm ring 24 is rotated relative to the stationary diaphragm ring 28 an opening or closing of the diaphragm is accomplished. The rear lens element 34 is adapted to be screwed into the rear end of the lens tube 10.

The diaphragm operating ring 35 is adapted to be screwed onto the stationary collar 22 and have a limited rotation thereon. This diaphragm operating ring is provided with a shell portion 36' which overlies a cutout portion 37' on the stationary collar 22 so that the scale of diaphragm setting on the ring 35 can be aligned with an index point on the surface of the collar 22.

The diaphragm operating ring 35 is operably connected with the movable diaphragm ring 24 by means of a connecting ring 36 so that a rotation of the ring 35 will cause a subsequent rotation of the movable diaphragm ring 24 to open and close the diaphragm leaves connected thereto. This connecting member 36 is in the form of a shell having one portion 37 of such a diameter that in its assembled position, see Figure 1, it is flush with a part of the inner periphery of the stationary collar 22 by which member it is partially confined to its assembled position on the lens tube 10. Portion 37 of the ring 36 extends forwardly of the mount to abut the wall 38 of the lens tube 10 whereby it is longitudinally positioned with respect to movement forward of said barrel. An arcuate lip 39 on the connecting ring 36 is adapted to snugly fit into a circumferential groove 40, Figure 4, in the periphery of the lens tube 10 to be rotatable therein but fixed against longitudinal movement with respect thereto. It can be understood by one skilled in the art that if the arcuate lips 39 were left completely circular in form, the diameter thereof would prohibit the connecting ring from being assembled onto the lens tube 10 by being slid over the rear end thereof. Therefore, it has been found that by milling off three-quarters of that circle to leave the one-quarter arcuate lip 39, as shown in Figure 2, this ring 36 can be slipped over the rear end of the lens tube 10 and said lip portion 39 dropped into the groove 40 in the tube 10.

Referring now particularly to Fig. 4 wherein the method of mounting the connecting ring 36 on the lens tube 10 is shown, after the connecting ring 36 is properly seated on the lens tube 10, a screw 41 is passed through an elongated slot 42 in the lip 39, through a radial slot 43' in the lens tube 10, and finally into the extension 26 of the movable diaphragm ring 24, see Figure 1, thus connecting the ring 36 with the movable diaphragm ring 24 so that a rotation of said connecting ring will be transmitted to operate the diaphragm. The other end, or portion 37, of the connecting ring 36 is provided with an elongated slot 43 into which extends a screw 44, which is fixed to the diaphragm operating ring 35 and passes through a circumferential slot 45 in the stationary collar 22. The particular connection between the diaphragm operating ring 35 and the movable diaphragm ring 24, just described, allows an oscillatable adjustment for the rotating parts and also provides a connection between said parts which can be maintained without hindering the longitudinal adjustment of the lens tube for focusing purposes.

An adapter ring 46 is threaded onto the rear end of the stationary collar 22, said ring having an externally threaded portion 47 for positioning the lens mount as a whole in a given camera. The combination of the adapter ring 46 and the stationary collar 22 acts as a support for the entire lens mount assembly. The rear portion 48 of said adapter ring is adapted to fit the periphery of the lens tube 10 closely and act as an additional means for holding the connecting ring 36 in its assembled position on the mount by confining the arcuate lip 39 thereof within the circumferential groove 40 around the lens tube.

In Figure 8, I have shown a modified form for the connecting member 36 which operates in exactly the same manner as the preferred form of the connecting ring shown in Figure 2, but which is assembled to the mount in a substantially different manner. In Figure 8, the connecting member 50 instead of being circular, as shown in Figure 2, is only a sector portion conforming to the size of the lip 39. In assembling this connecting member 50, the lip 39 thereof is merely set in the circumferential groove 40 in the lens tube 10, the curvature thereof conforming to the periphery of the base of said groove so that the diaphragm operating ring 35 is connected with the movable diaphragm ring 24, as described above, and the connecting member 50 is held in place on the tube 10 by the stationary collar 22 and the adapter ring 48, which combination forms a stationary support of the entire lens mount assembly.

Referring again to Figure 1, the rearward and forward longitudinal focusing movement of the lens tube 10 is limited by virtue of the sliding engagement between the set screw 51 fixed to the tube 10 and the longitudinal slot 52 in the adapter ring 48. The lug 53 fastened to the adapter ring acts to position the lens mount in the adapter of a camera.

Although I have shown and described certain specific embodiments of my invention, I am fully aware that many modifications of the same are possible. My invention, therefore, is not to be restricted except in so far as is necessitated by the prior art and by the spirit of the appended claims.

Having thus described my invention, what I declare is new and desire to secure by Letters Patent is:

1. In a focusing lens mount, the combination of a support, a lens tube whose periphery is provided with a circumferential groove mounted in said support and capable of longitudinal movement with respect thereto, said tube including a diaphragm comprising a fixed ring and a movable ring carrying diaphragm leaves, an arcuate member movably mounted in the groove of the lens tube and engaging the movable diaphragm ring for turning the latter, and a diaphragm operating ring oscillatably mounted on the support longitudinally remote from said diaphragm and having a sliding engagement with the arcuate member for adjusting the same.

2. In a focusing lens mount, the combination of a support, a lens tube whose periphery is provided with a circumferential groove carried thereby, a ring in screw threaded engagement with said support and said lens tube for moving one relatively to the other, a diaphragm in said lens tube comprising a fixed ring and a movable ring carrying diaphragm leaves, a diaphragm operating ring oscillatably mounted on said support, and a slotted arcuate member movably mounted in the groove in said lens tube, one end of said arcuate member having a longitudinal sliding engagement in said movable diaphragm ring while the other end thereof is in sliding engagement with said movable diaphragm operating ring for transmitting motion from one to the other.

3. In a focusing lens mount, the combination with a support, a lens tube movably mounted in said support and having its periphery provided with a circumferential groove, said tube including a diaphragm comprising a fixed ring and a movable ring carrying diaphragm leaves, a diaphragm operating ring oscillatably mounted on said support, suitable means for operably connecting said diaphragm operating ring and said movable diaphragm ring, said means comprising a ring member having a lip portion movably mounted in the groove of said lens tube, said ring member capable of being slipped over the rear end of the lens tube to its operating position.

4. In a focusing lens mount, the combination with a support, a lens tube movably mounted in said support and having its periphery provided with a circumferential groove, said tube including a diaphragm comprising a fixed ring and a movable ring carrying leaves, means fixed to the movable ring of said diaphragm and projecting radially through said lens tube and into the groove therein, a slotted arcuate connecting member movably mounted in the groove of said lens tube and having a sliding engagement with said means fixed to said rotatable diaphragm ring, and a diaphragm operating ring oscillatably mounted on said support longitudinally remote from said diaphragm and having a sliding engagement with said arcuate connecting member for adjusting the same.

5. In a focusing lens mount, the combination with a support, a lens tube movably mounted in said support and having its periphery provided with a circumferential groove, said tube including a diaphragm comprising one fixed and one movable ring carrying leaves, a screw fixed to said movable diaphragm ring and projecting radially therefrom into the groove in the lens tube, a diaphragm operating ring oscillatably mounted on said support, a screw fixed to said operating ring and projecting radially into the mount, and a slotted arcuate connecting member movably mounted in the groove in said lens tube and having sliding engagement with said screws fixed to said movable diaphragm ring and said operating ring for operably connecting the two.

VICTOR V. COLAIACE.